United States Patent
Biss et al.

(10) Patent No.: US 7,151,632 B2
(45) Date of Patent: Dec. 19, 2006

(54) APPARATUS FOR PRODUCTION OF AN INHOMOGENEOUSLY POLARIZED OPTICAL BEAM FOR USE IN ILLUMINATION AND A METHOD THEREOF

(75) Inventors: David P. Biss, Williamson, NY (US); Thomas G. Brown, Rochester, NY (US); Kathleen S. Youngworth, Rochester, NY (US)

(73) Assignee: University of Rochester, Rochester, NY (US)

( * ) Notice: Subject to any disclaimer, the term of this patent is extended or adjusted under 35 U.S.C. 154(b) by 737 days.

(21) Appl. No.: 09/759,913

(22) Filed: Jan. 12, 2001

(65) Prior Publication Data

US 2006/0238865 A1    Oct. 26, 2006

(51) Int. Cl.
G02B 5/30 (2006.01)
G02B 27/28 (2006.01)
G02B 21/00 (2006.01)
G01B 9/02 (2006.01)

(52) U.S. Cl. ............... 359/371; 359/386; 359/495; 359/498; 359/900; 356/491; 356/453; 250/225

(58) Field of Classification Search ............... 359/368, 359/370, 371, 385, 900, 386, 495, 498; 250/216, 250/225, 492.1; 356/453, 491
See application file for complete search history.

(56) References Cited

U.S. PATENT DOCUMENTS

| | | | | |
|---|---|---|---|---|
| 3,060,808 A | * | 10/1962 | Koester | |
| 3,182,551 A | * | 5/1965 | Piller | |
| 3,658,405 A | * | 4/1972 | Pluta | ............... 359/371 |
| 4,634,880 A | * | 1/1987 | Lindow et al. | |
| 4,978,970 A | * | 12/1990 | Okazaki | |
| 5,081,350 A | * | 1/1992 | Iwasaki et al. | |
| 5,161,053 A | * | 11/1992 | Dabbs | |
| 5,162,648 A | * | 11/1992 | Iwasaki | |
| 5,168,157 A | * | 12/1992 | Kimura | ............... 250/234 |
| 5,218,195 A | * | 6/1993 | Hakamata | |
| 5,260,569 A | * | 11/1993 | Kimura | |
| 5,386,317 A | * | 1/1995 | Corle et al. | |
| 5,420,717 A | * | 5/1995 | Tabata | ............... 359/371 |
| 5,426,503 A | * | 6/1995 | Kusunose | ............... 356/520 |
| 5,504,619 A | * | 4/1996 | Okazaki | ............... 359/495 |

(Continued)

OTHER PUBLICATIONS

R. D. Allen et al., "The Zeiss-Nomarski Differential Interference Equipment For Transmitted Light Microscopy," *Z. wiss. Mikroskopie*, 69:193-221 (1969).

(Continued)

*Primary Examiner*—Ricky D. Shafer
(74) *Attorney, Agent, or Firm*—Nixon Peabody LLP

(57) ABSTRACT

An apparatus for producing an inhomogeneously polarized optical beam from a homogeneously polarized input optical beam includes a first phase shifter, a second phase shifter, and one or more polarization beam splitters. The first phase shifter shifts at least one portion of a first part of the input optical beam by a first phase. The second phase shifter shifts at least one portion of a second part of the input optical beam by substantially the first phase. The one or more polarization beam splitters split the input optical beam into the first part and the second part and combine the phase shifted portion and substantially all other portions of the first part of the input optical beam with the phase shifted portion and substantially all other portions of the second part of the input optical beam to produce the inhomogeneously polarized optical beam.

12 Claims, 10 Drawing Sheets

U.S. PATENT DOCUMENTS

| | | | | |
|---|---|---|---|---|
| 5,521,705 | A | * | 5/1996 | Oldenbourg et al. |
| 5,604,591 | A | * | 2/1997 | Kitagawa .................... 356/491 |
| 5,673,103 | A | * | 9/1997 | Inoue et al. ................. 355/71 |
| 5,914,782 | A | * | 6/1999 | Sugiyama ................... 356/491 |
| 5,969,855 | A | * | 10/1999 | Ishiwata et al. ............ 359/386 |
| 6,020,963 | A | * | 2/2000 | DiMarzio ................... 356/491 |
| 6,128,127 | A | * | 10/2000 | Kusaka |
| 6,369,375 | B1 | * | 4/2002 | Ishiwata ................. 250/208.1 |
| 6,693,711 | B1 | * | 2/2004 | Leger et al. ................ 356/369 |

OTHER PUBLICATIONS

E. Slayter, "The Interference Microscope," *Optical Methods in Biology*, Chapter 14., New York:John Wiley & Sons, p. 303 (1970).

E. Slayter, "The Polarizing Microscope," *Optical Methods in Biology*, Chapter 15, New York:John Wiley & Sons, pp. 318-340 (1970).

D. Pohl, "Operation Of A Ruby Laser In The Purely Transverse Electric Mode $TE_{01}$," *Appl. Phys, Lett.*, 20:266-267 (1972).

J. J. Wayne, "Generation Of the Rotationally Symmetric $TE_{01}$ and $TM_{01}$ Modes From A Wavelength-Tunabel Laser," *IEEE J. Quant. Elec.*, QE-10:125-127 (1974).

M. E. Marhic et al., "Low-Order $TE_{0q}$ Operation Of A $CO_2$ Laser For Transmission Through Circular Metallic Waveguides," *Appl. Phys. Lett.*, 38:743-745 (1981).

R. Yamaguchi et al., "Liquid-Crystal Polarizers With Axially Symmetrical Properties," *Japanese Journal of Applied Physics*, 28:1730-1731 (1989).

C. J. Cogswell et al., "Confocal Brightfield Imaging Techniques," T. Wilson, *Confocal Microscopy*, London:Academic Press Limited, Chapter 8, p. 229 (1990).

S. C. Tidwell et al., "Generating Radially Polarized Beams Interferometrically," *Applied Optics*, 29:2234-2239 (1990).

T. Erdogan et al., "Circularly Symmetrical Operation Of A Concentric-Circle-Grating, Surface-Emitting, AlGaAs/GaAs Quantum-Well Semiconductor-Laser," *Appl. Phys. Lett.*, 60:1921-1923 (1992).

E. G. Churin et al., "Polarization Configurations With Singular Point Formed By Computer-Generated Holograms," *Optics Communications*, 99:13-17 (1993).

S. C. Tidwell et al., "Efficient Radially Polarized Laser Beam Generation With A Double Interferometer," *Applied Optics*, 32:5222-5229 (1993).

R. H. Jordan et al., "Free-Space Azimuthal Paraxial Wave Equation: The Azimuthal Bessel-Gauss Beam Solution," *Optics Letters*, 19:427-429 (1994).

D. G. Hall, "Vector-Beam Solutions Of Maxwell's Wave Equation," *Optics Letters*, 21:9-11 (1996).

P. L. Greene et al., "Diffraction Characteristics Of The Azimuthal Bessel-Gauss Beam," *J. Opt. Soc. Am. A*, 13:962-966 (1996).

M. Stalder et al., "Linearly Polarized Light With Axial Symmetry Generated By Liquid-Crystal Polarization Converters," *Optics Letters*, 21:1948-1950 (1996).

K. S. Youngworth et al., "Inhomogeneous Polarization in Scanning Optical Microscopy," *Proceedings of the SPIE*, 3919:78-85 (2000).

\* cited by examiner

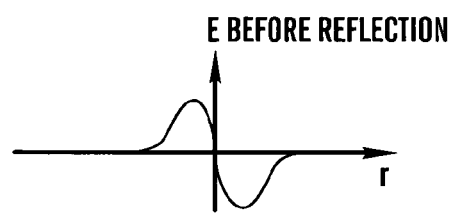
*FIG. 9A*
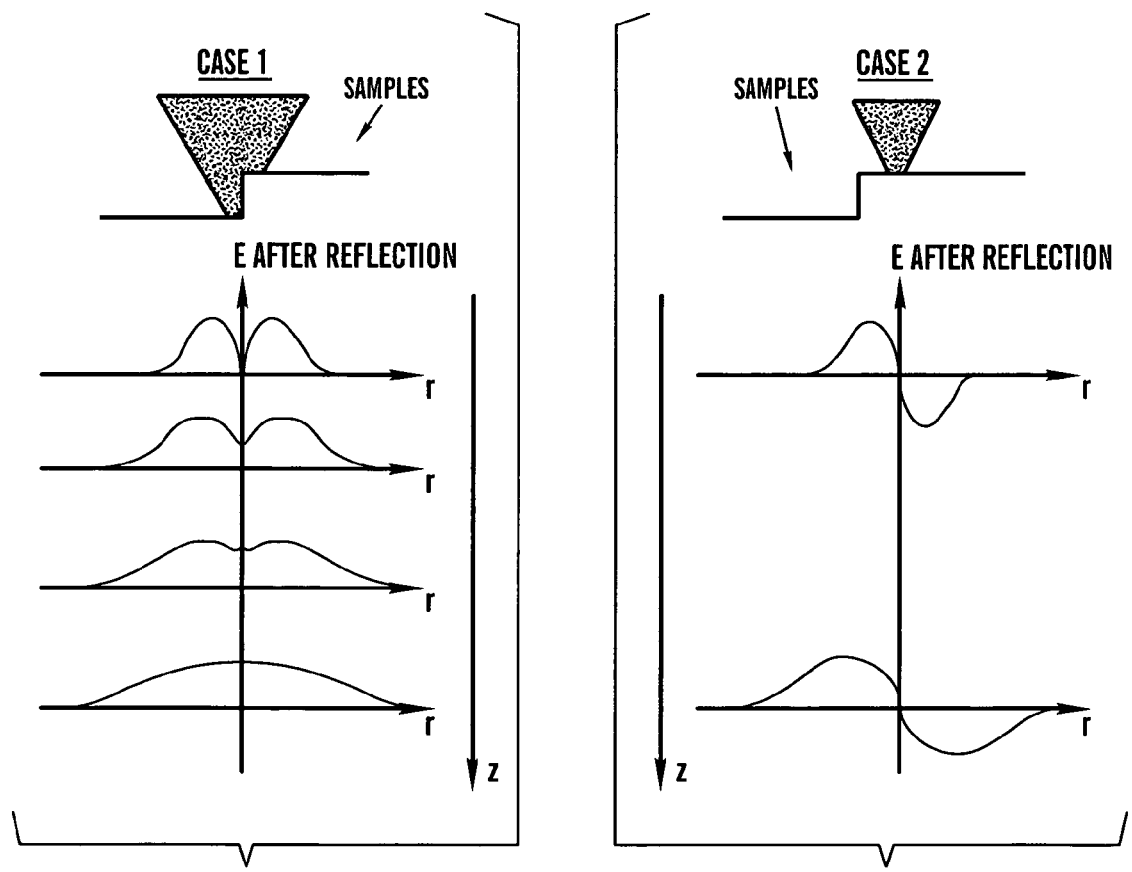
*FIG. 9B*  *FIG. 9C*

APPARATUS FOR PRODUCTION OF AN INHOMOGENEOUSLY POLARIZED OPTICAL BEAM FOR USE IN ILLUMINATION AND A METHOD THEREOF

FIELD OF THE INVENTION

The present invention relates to polarization converters and, more particularly, to polarization converters which produce inhomogeneously polarized optical beams for illumination and methods thereof.

BACKGROUND OF THE INVENTION

Homogeneous polarized light is used in a variety of different applications. For example, homogeneous polarized light is used in microscopy to improve the visibility of objects that are not easily seen with conventional microscopes. Conventional microscopes with crossed polarizers, phase contrast microscopes and Differential Interference Contrast (DIC) microscopes all use homogeneous polarized light. These microscopes produce images which transform round-trip optical path differences or local anisotropy in the sample, to intensity variations in the image. The components and operation of these microscopes are well known as set forth in, "The Principles of Scanning Confocal Microscopy" by T. H. Wilson which is herein incorporated by reference.

However, inhomogeneous polarized light has not been considered for use in many applications, such as imaging systems in general and microscopes in particular. Although optical beams or light having radial or azimuthal inhomogeneous polarization have been produced, there are problems with the resulting optical beams or light.

For example, lasers, such as the concentric-circle-grating surface-emitting (CCGSE) semiconductor laser, can be used to generate azimuthally polarized light. Unfortunately, it is not easy to control which of the many possible azimuthal modes light emitted by the CCGSE laser will have. As a result, the azimuthally polarized light is of little use.

Spiral wave plates and diffractive elements in interferometers have also been used to produce optical beams with both types of polarization. Unfortunately, both of these approaches have, to date, produced beams of unsatisfactory quality and have required expensive fabrication procedures.

SUMMARY OF THE INVENTION

An apparatus for producing an inhomogeneously polarized optical beam from a homogeneously polarized input optical beam in accordance with one embodiment of the present invention includes a first phase shifter, a second phase shifter, and one or more polarization beam splitters. The first phase shifter shifts at least one portion of a first part of the input optical beam by a first phase. The second phase shifter shifts at least one portion of a second part of the input optical beam by substantially the first phase. The one or more polarization beam splitters split the input optical beam into the first part and the second part and combine the phase shifted portion and substantially all other portions of the first part of the input optical beam with the phase shifted portion and substantially all other portions of the second part of the input optical beam to produce the inhomogeneously polarized optical beam.

An apparatus for producing an inhomogeneously polarized optical beam from a homogeneously polarized input optical beam in accordance with another embodiment of the present invention includes a first polarization beam splitter, a first phase shifter, a second phase shifter, and a second polarization beam splitter. The first polarization beam splitter splits the input optical beam into a first part and a second part. The first phase shifter shifts at least one portion of the first part of the input optical beam by a first phase. The second phase shifter shifts at least one portion of the second part of the input optical beam by substantially the first phase. The second polarization beam splitter combines the shifted portion and substantially all other portions of the first part of the input optical beam with the shifted portion and substantially all other portions of the second part of the input optical beam to produce the inhomogeneously polarized optical beam.

In accordance with another embodiment, the present invention provides a method for producing an inhomogeneously polarized optical beam from a homogeneously polarized input optical beam. With this method, the input optical beam is split into a first part and a second part. At least one portion of the first part of the input optical beam is shifted by a first phase. At least one portion of the second part of the input optical beam is shifted by substantially the first phase. Next, the shifted portion and substantially all other portions of the first part of the input optical beam is combined with the shifted portion and substantially all other portions of the second part of the input optical beam to produce the inhomogeneously polarized optical beam.

An apparatus for producing an inhomogeneously polarized optical beam from a homogeneously polarized input optical beam in accordance with another embodiment of the present invention includes a polarization beam splitter, a first reflective phase shifter, and a second reflective phase shifter. The polarization beam splitter splits the input optical beam and transmits a first part of the input optical beam and a second part of the input optical beam. The first reflective phase shifter reflects and phase shifts a first amount at least a portion of the transmitted first part of the input optical beam back to the polarization beam splitter. The second reflective phase shifter reflects and phase shifts substantially the first amount at least a portion of the transmitted second part of the input optical beam back to the polarization beam splitter. The polarization beam splitter combines the reflected and phase shifted first and second parts of the input optical beam to produce the inhomogeneously polarized optical beam.

In accordance with another embodiment, the present invention provides another method for producing an inhomogeneously polarized optical beam from a homogeneously polarized input optical beam. With this method, the input optical beam is split and a first part of the input optical beam and a second part of the input optical beam are transmitted. At least a portion of the transmitted first part of the input optical beam is reflected and phase shifted a first amount. At least a portion of the transmitted second part of the input optical beam is also reflected and phase shifted substantially the first amount. The reflected and phase shifted first and second parts of the input optical beam are combined to produce the inhomogeneously polarized optical beam.

An apparatus for producing an inhomogeneously polarized optical beam from a homogeneously polarized input optical beam in accordance with yet another embodiment of the present invention includes a polarization beam splitter, a first reflective phase shifter, and a second reflective phase shifter. The polarization beam splitter has a surface positioned at a Brewster angle with respect to a direction of propagation of the input optical beam along a first axis. The polarization beam splitter splits the input optical beam and transmits a first part of the input optical beam and a second part of the input optical beam. The first reflective phase shifter reflects and phase shifts a first amount at least a portion of the transmitted first part of the input optical beam back to the polarization beam splitter. The second reflective phase shifter reflects and phase shifts substantially the first amount at least a portion of the transmitted second part of the input optical beam back to the polarization beam splitter. The polarization beam splitter combining the reflected and phase shifted first and second parts of the input optical beam to produce the inhomogeneously polarized optical beam.

In accordance with yet another embodiment, the present invention provides a method for producing an inhomogeneously polarized optical beam. With this method, a homogeneously polarized input optical beam having a direction of propagation along a first axis which is at a Brewster angle with respect to a surface of a polarization beam splitter is provided. The input optical beam is split and is transmitted as first and second parts by the polarization beam splitter. At least a portion of the transmitted first part of the input optical beam is reflected and phase shifted a first amount. Additionally, at least a portion of the second part of the input optical beam is reflected and phase shifted substantially the first amount. The reflected and phase shifted first and second parts of the input optical beam are combined to produce the inhomogeneously polarized optical beam.

A microscope comprising a source for a homogeneously polarized input optical beam, a polarization converter which produces an inhomogeneously polarized optical beam from the homogeneously polarized input optical beam, and a microscopic imaging system which captures an image of sample using the inhomogeneously polarized optical beam.

In accordance with yet another embodiment, a method for microscopic scanning comprises providing a homogeneously polarized input optical beam, producing an inhomogeneously polarized optical beam from the input optical beam, and capturing a microscopic image using the inhomogeneously polarized optical beam.

The present invention provides a reliable and controllable method and apparatus for producing inhomogeneous polarized optical beams or light. As a result, the inhomogeneous polarized light produced in accordance with the present invention can be used in a variety of applications, such as imaging. Under suitable circumstances, the inhomogeneously polarized beams provide a unique distribution of electric fields near the focus of an imaging system. This inhomogeneous polarization can be used to advantage in surface and particle imaging and in electron manipulation. In particular, the inhomogeneous polarized light can be used effectively in scanning microscopy.

A focused beam of radially inhomogeneous polarization may be used to advantage for surface second harmonic generation and other nonlinear optical processes. A collimated beam of radially inhomogeneous polarization may also be used as a means of relativistic electron acceleration.

BRIEF DESCRIPTION OF THE DRAWINGS

FIG. 9A is a graph illustrating a sample of light before being reflected;

FIG. 9B is a graph illustrating the sample of light after being reflected off of different sample heights;

FIG. 9C is a graph illustrating the sample of light after being reflected off of the same sample height.

DETAILED DESCRIPTION

Figure 1:
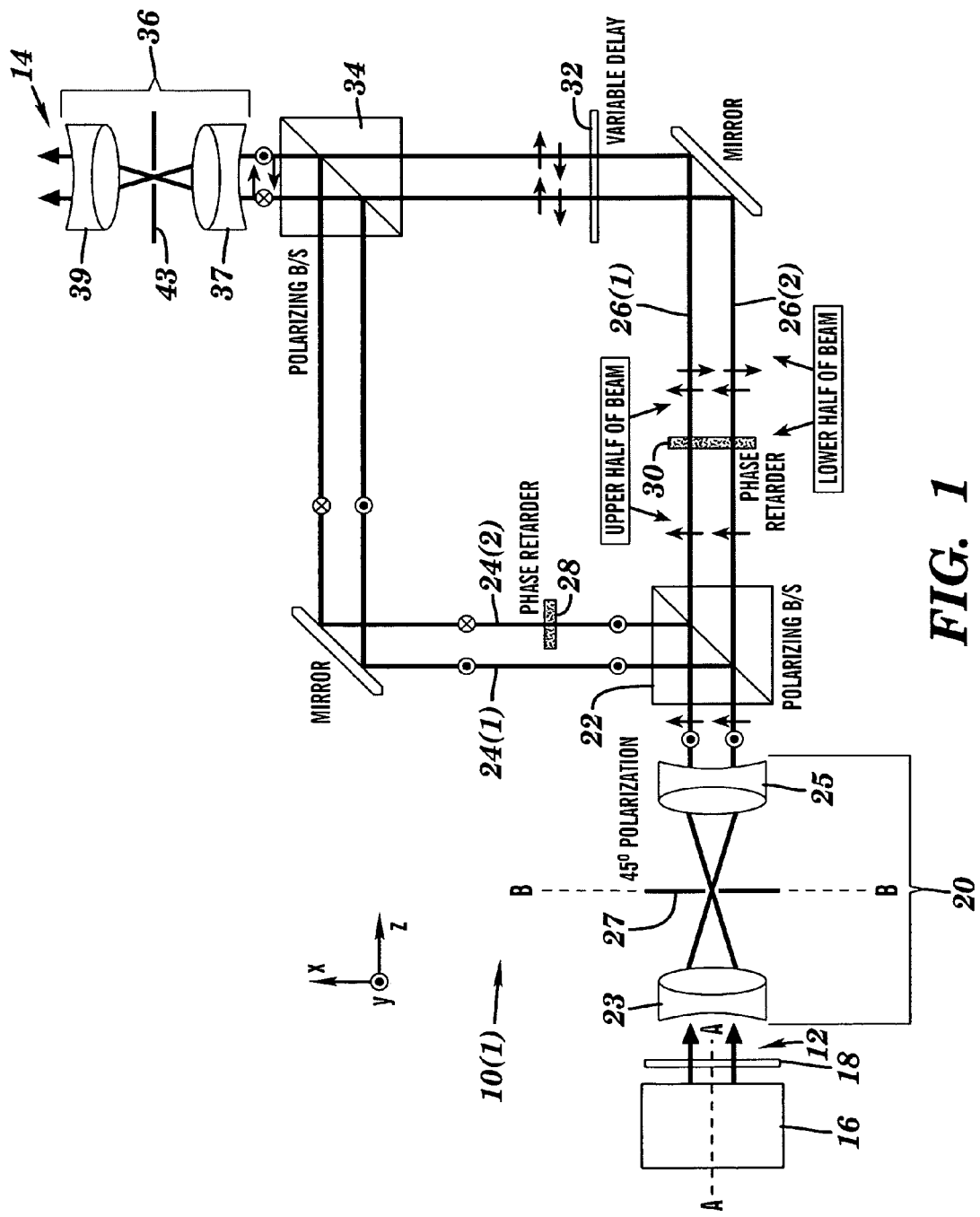
FIG. 1 is a block diagram of a polarization converter in accordance with one embodiment of the present invention.
Figure 2:
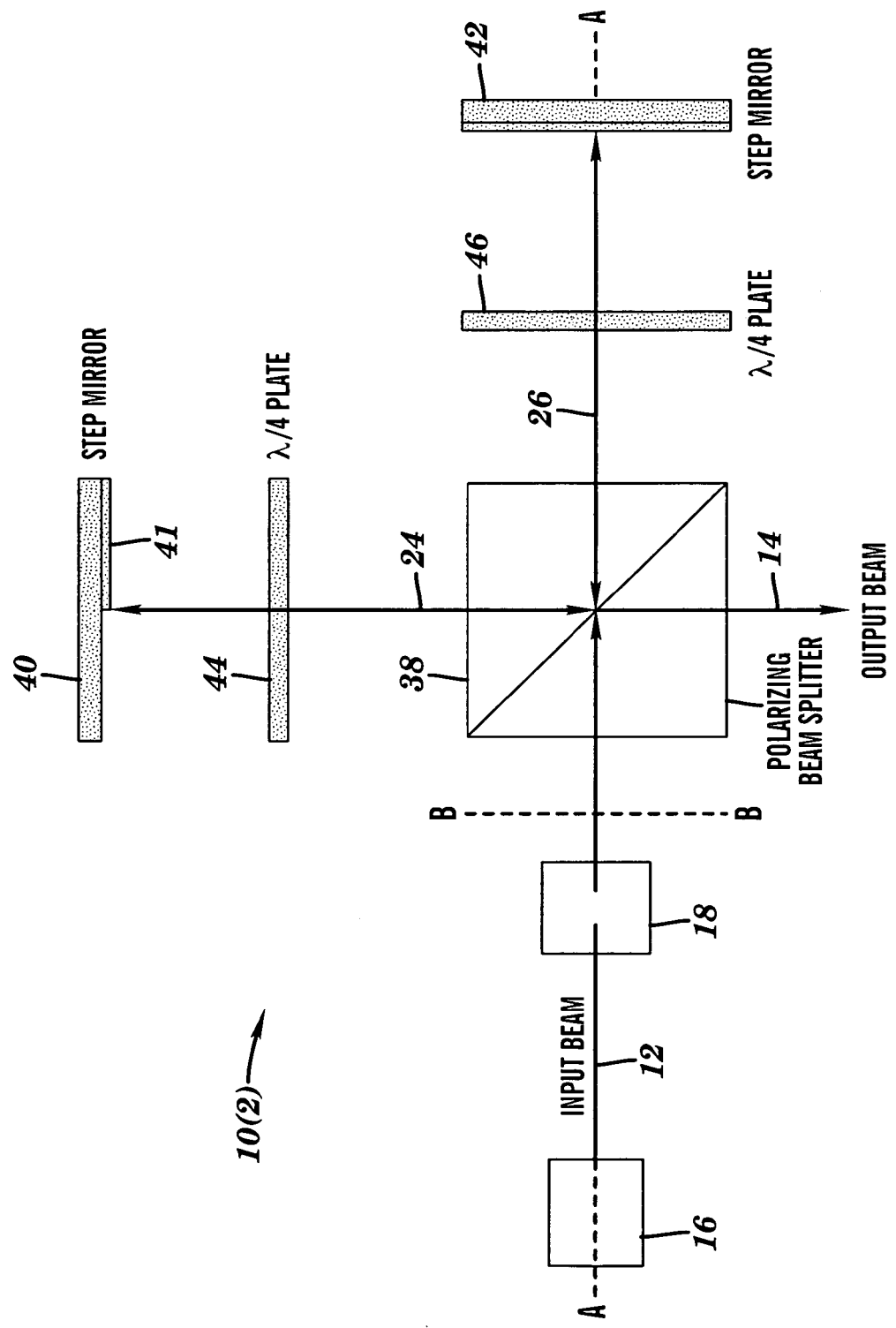
FIG. 2 is a block diagram of a polarization converter in accordance with another embodiment of the present invention.
Figure 3:
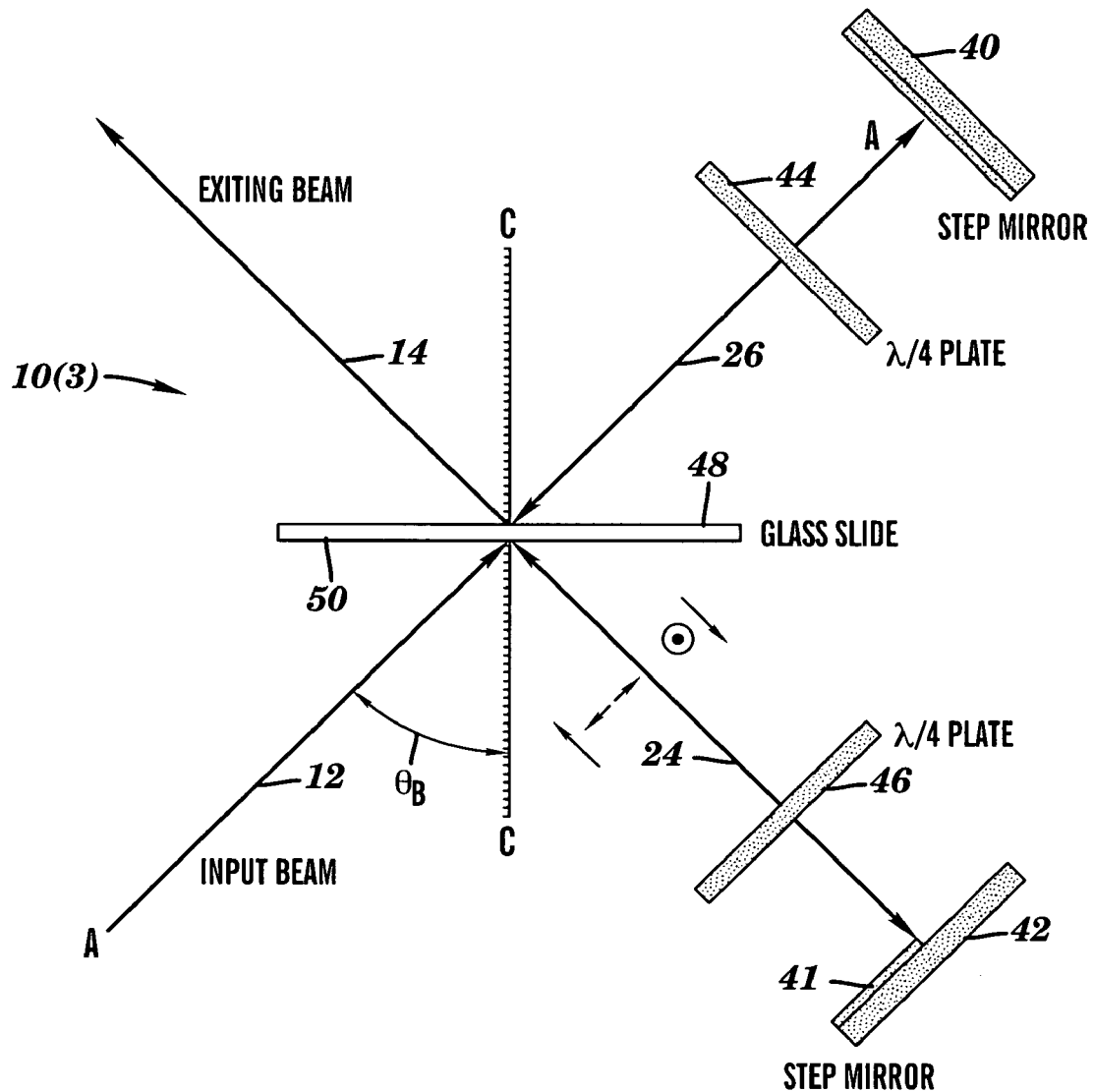
FIG. 3 is a block diagram of a polarization converter in accordance with yet another embodiment of the present invention.

Apparatuses 10(1)–10(3) for producing an inhomogeneously polarized optical beam 14 from a homogeneously polarized input optical beam 12 in accordance with different embodiments of the present invention are illustrated in FIGS. 1–3. The apparatuses 10(1)–10(3) each include a first phase shifter, a second phase shifter, and one or more polarization beam splitters. The present invention provides number of advantages including providing a reliable and controllable method and apparatus for producing an inhomogeneous polarized optical beam or light 14. As a result, the inhomogeneous polarized light 14 produced in accordance with the present invention can be used in a variety of applications, such as imaging and, more specifically, in scanning microscopy.

Referring to FIG. 1, a polarization converter 10(1) in accordance with one embodiment of the present invention is illustrated. In this particular embodiment, the polarization converter 10(1) can produce an azimuthal or radially, inhomogeneously polarized beam from a uniform, linearly polarized beam. Some or all of the components of the polarization converter 10(1) discussed below may be contained within and/or connected together in a housing.

A source 16 provides the input optical beam or light 12 for the polarization converter 10(1). The input optical beam 12 from the source 16 propagates along in a first direction along a first axis A—A. The arrows representing optical beam 12 are different optical rays of the same optical beam 12. In this particular embodiment, the source 16 is a laser beam generation system which generates a linearly polarized HeNe laser beam, although other types of sources for the homogeneously polarized input optical beam 12 can be used. The source 16 for the homogeneously polarized input optical beam 12 may be part of or separate from the polarization converter 10(1).

A polarizer 18 is positioned to polarize the homogeneously polarized input optical beam 12 from the source to a first angle with respect to a second axis B—B that is perpendicular to the first axis A—A along which the homogeneously polarized input optical beam 12 propagates. In this particular embodiment, the first angle is 45°, although other angles could be used. Adjusting the beam polarization of the homogeneously polarized input optical beam 12 to substantially ±45° with respect to the second axis B—B makes the homogeneously polarized input optical beam 12 more sensitive to changes in path length. Like the source 16 for the homogeneously polarized input optical beam, the polarizer 18 may be part of or separate from the polarization converter 10(1).

An optional filter 20 is positioned to receive the homogeneously polarized input optical beam 12 polarized by the polarizer 18. In this particular embodiment, the filter 20 is a spatial filter which comprises a pair of lens 23 and 25 separated by a plate 27 with pinhole, although other types of filters can be used. In this particular example, lens 23 focuses the optical beam 12 through the pinhole in plate 27 on to lens 25, although other configurations are possible.

A polarizing beam splitter 22 is positioned to receive and split the homogeneously polarized input optical beam 12 into and to transmit a first part 24 and a second part 26. More specifically, 24(1) and 24(2) represent different portions of the first part 24 and 26(1) and 26(2) represent different portions of second part 26. In this particular embodiment, 24(1) and 24(2) each represent about half of the first part 24, and 26(1) and 26(2) each represent about half of the second part, although the proportions of each portion 24(1), 24(2), 26(1) and 26(2) and the number of portions for each part 24 and 26 can vary as needed for the particular application. A variety of different types of polarizing beam splitters 22 can be used which split the optical beam into differing numbers of parts.

In this particular embodiment, phase shifters 28 and 30 are positioned to receive at least a portion 24(2) and 26(1-2) of the first and second parts of the homogeneously polarized input optical beam 12 from the polarization beam splitter 22. Each of the phase shifters 28 and 30 shifts the phase of the portions 24(2) and 26(1-2) of the first and second parts substantially a first phase amount. A variety of different types of phase shifters 28 and 30 can be used, such as dielectric, metal film, or grating beam splitters. In this particular embodiment, each of the phase shifters 28 and 30 is a glass window, the first phase amount is substantially π, and about half of the first part 24(2) and all of the second part 26(1-2) of the homogeneously polarized input optical beam 12 are sent through the phase shifters 28 and 30 respectively, although other types of phase shifters 28 and 30 can be used, such as dielectric, metal film, or grating beam splitters, other phase shifts amounts can be used, and other proportions of the first and second parts 24(1-2) and 26(1-2) of the homogeneously polarized input optical beam 12 can be sent through the phase shifters 28–30.

A variable delay device 32 may be positioned to receive the second part 26(1-2) of the homogeneously polarized input optical beam 12 from one of the phase shifters 30. The variable delay device 32 delays the second part 26(1-2) of the homogeneously polarized input optical beam 12 to correct for slight path differences between the first and second parts 24(1-2) and 26(1-2), although a variable delay device 32 may be positioned to delay one or both of the first and second parts 24(1-2) and 26(1-2) of the homogeneously polarized input optical beam 12. The amount of delay introduced by the variable delay device 32 is adjustable. A variety of different delay devices 32 can be used, such as a plane parallel delay.

In this particular embodiment, another polarizing beam splitter 34 is positioned to receive substantially all of the portions of the first and second parts 24(1-2) and 26(1-2) of the homogeneously polarized input optical beam 12 from the polarizing beam splitter 22, the phase shifter 28, and the variable delay device 32, although other configurations are possible. The polarization beam splitter 34 combines the received first and second parts 24(1-2) and 26(1-2) of the homogeneously polarized input optical beam 12 to produce an inhomogeneously polarized optical beam 14. The arrows representing the inhomogeneously polarized optical beam 14 are different optical rays of the same inhomogeneously polarized optical beam 14. Again, a variety of different types of polarizing beam splitters 34 can be used.

Another optional filter 36 may be positioned to receive the inhomogeneously polarized optical beam 14 from the polarization beam splitter 34. In this particular embodiment, the filter 36 is also a spatial filter which comprises a pair of lens 37 and 39 separated by a plate 43 with pinhole, although other types of filters can be used. In this particular example, lens 37 focuses the inhomogeneously polarized optical beam 14 through the pinhole in plate 43 on to lens 39, although other configurations are possible.

Although the above embodiment, produces an azimuthal inhomogeneously polarized optical beam, a radial inhomogeneously polarized optical beam can also be obtained with the same system by rotating each of the phase shifters 28 and 30 through an angle of substantially 90° (degrees). All of the other components and their orientation and operation for the polarization converter 10(1) are the same as described herein.

One example of the operation of the polarization converter 10(1) to produce an azimuthal inhomogeneously polarized optical beam 14 will now be discussed with reference to FIG. 1. In this particular example, an input, linearly polarized optical beam 12, such as an HeNe laser beam, is generated and transmitted. The homogeneously polarized input optical beam 12 propagates along in a first direction along a first axis A—A.

In this particular embodiment, the homogeneously polarized input optical beam 12 is polarized at 45° with respect to a second axis B—B perpendicular to the first axis A—A. Adjusting the polarization of the homogeneously polarized input optical beam 12 to substantially ±45° with respect to the second axis B—B assures substantially equal intensities in the first and second parts 24 and 26 of optical beam 12. Once the input beam 12 is polarized, in this particular embodiment the input beam 12 is filtered with the spatial filter 20.

Next, the homogeneously polarized input optical beam 12 is split into first and second parts 24 and 26 by a polarization beam splitter 22. Although in this particular embodiment, the homogeneously polarized input optical beam 12 is split into two parts 24 and 26, the optical beam 12 can be split into other numbers of parts depending upon the particular application. The first and second parts 24 and 26 of the homogeneously polarized input optical beam 12 are transmitted from the polarization beam splitter 22.

Next, a portion 24(2) of the first part of the homogeneously polarized input optical beam and substantially all of the second part 26(1-2) of the optical beam are delayed a first phase amount by phase shifters 28 and 30. In this particular example, the portion 24(2) is substantially one-half of the first part 24 and substantially all of the second part 26(1-2) and the first phase amount is substantially π, although other proportions of the first and second parts 24(1-2) and 26(1-2) and other phase shift amounts can be used.

Once at least a portion of the first and second parts 24(1-2) and 26(1-2) of the homogeneously polarized input optical beam 12 has been phase shifted, in this particular embodiment the second part 26(1-2) of the homogeneously polarized input optical beam 12 is variably delayed by the variable delay device 32. The variable delay is adjustable and is used to correct for slight path differences between the first and second parts 24(1-2) and 26(1-2). Adjustments to the path length difference are made, as needed, by rotating the variable delay device 32. Although in this particular example, the second part 26(1-2) is variably delayed, a variable delay may be applied to one or both of the first and second parts 24(1-2) and 26(1-2) of the homogeneously polarized input optical beam 12 in differing amounts.

Following the delays discussed above, the first and second parts 24(1-2) and 26(1-2) of the homogeneously polarized input optical beam 12 are combined in the second polarization beam splitter 34 to produce an azimuthal inhomogeneously polarized optical beam 14. The azimuthal inhomogeneously polarized optical beam 14 may then be filtered by the spatial filter 36. The polarization in this optical beam 14 remains stable for time periods greater than the time needed to obtain an image.

Referring to FIG. 2, a polarization converter 10(2) in accordance with another embodiment of the present invention is illustrated. Some or all of the components of the polarization converter 10(2) discussed below may be contained within and/or connected together in a housing.

A source 16 provides the homogeneously polarized input optical beam or light 12 for the polarization converter 10(2). The homogeneously polarized input optical beam 12 from the source 16 propagates along in a first direction along a first axis A—A. A variety of different types of sources 16 for homogeneously polarized input optical beams can be used, such as a source 16 which provides an HeNe laser beam. The source 16 for the homogeneously polarized input optical beam 22 may be part of or separate from the polarization converter 10(2).

A polarizer 18 is positioned to polarize the homogeneously polarized input optical beam 12 from the source to a first angle with respect to a second axis B—B that is perpendicular to the first axis A—A along which the homogeneously polarized input optical beam 12 propagates. In this particular embodiment, the first angle is substantially 45° (degrees), although other angles could be used. Adjusting the beam polarization of the homogeneously polarized input optical beam 12 to substantially ±45° with respect to the second axis B—B makes the homogeneously polarized input optical beam 12 more sensitive to changes in path length. Like the source 16 for the homogeneously polarized input optical beam 12, the polarizer 18 may be part of or separate from the polarization converter 10(2).

A polarizing beam splitter 38 is positioned to receive and to split the homogeneously polarized input optical beam 12 into first and second parts 24 and 26 which are transmitted from the polarizing beam splitter 38, although other configurations are possible. The beam splitter 38 also combines the reflected first and second parts 24 and 26 of the homogeneously polarized input optical beam 12 to produce the inhomogeneously polarized optical beam 14. A variety of different types of polarizing beam splitters 38 can be used.

Reflective phase shifters 40 and 42 are positioned to reflect the first and second parts 24 and 26 of the homogeneously polarized input optical beam 12, respectively, back to the polarizing beam splitter 38. In this particular embodiment, each of the reflective phase shifters 40 and 42 is a step type reflective surface in which a mirror is divided by a step 41 and a reflection is provided from each side of the mirror, although other types of phase shifters could be used. To create radially, inhomogeneously polarized light, the step 41 in the reflective surface for reflective phase shifter 42 must be positioned at substantially zero degrees from the polarized axis of the homogeneously polarized input optical beam 12 (before it passes through the quarter-wave plate 46). To create azimuthally, inhomogeneously polarized light the step in the reflective surface for reflective phase shifter 42 must be oriented at substantially 90° degrees from the polarized axis of the homogeneously polarized input optical beam 12 (before it passes through the quarter-wave plate 46). Further, in this particular embodiment, reflective phase shifter 40 is given one orientation for the first part 24 of the homogeneously polarized input optical beam 12 and the reflective phase shifter 42 is given the opposite orientation for the second part 26 of the homogeneously polarized input optical beam 12, although other orientations could be used depending upon the application.

The quarter-wave plates 44 and 46 are positioned between the polarization beam splitter 38 and each of the reflective phase shifters 40 and 42, respectively, and substantially prevent the reflected portions of the first and second parts 24 and 26 from returning by the same path (e.g. toward the source 16). Although quarter-wave plates 44 and 46 are shown in this particular embodiment, other types of wave adjustment plates can be used.

One example of the operation of the polarization converter 10(2) to produce an azimuthal inhomogeneously polarized optical beam 14 will now be discussed with reference to FIG. 2. In this particular example, an input, linearly homogeneously polarized optical beam 12, such as an HeNe laser beam, is generated and transmitted. The homogeneously polarized input optical beam 12 propagates along in a first direction along a first axis A—A.

In this particular embodiment, the homogeneously polarized input optical beam 12 is polarized at substantially 45° with respect to a second axis B—B substantially perpendicular to the first axis A—A. Adjusting the polarization of the homogeneously polarized input optical beam 12 to substantially ±45° with respect to the second axis B—B makes the homogeneously polarized input optical beam 12 more sensitive to changes in path length.

Next, the homogeneously polarized input optical beam 12 is split into first and second parts 24 and 26 by a polarization beam splitter 38. Although in this particular embodiment, the homogeneously polarized input optical beam 12 is split into two parts 24 and 26, the optical beam 12 can be split into other numbers of parts depending upon the particular application. The first and second parts 24 and 26 of the homogeneously polarized input optical beam 12 are transmitted from the polarization beam splitter 38 towards quarter-wave plates 44 and 46.

Next, the first and second parts 24 and 26 pass through the quarter-wave plates 44 and 46, respectively. The quarter-wave plates 44 and 46 are oriented to convert the optical beams in the first and second parts 24 and 26 to circular polarization.

Next, the first and second parts 24 and 26 of the homogeneously polarized input optical beam 12 are reflected back by reflective phase shifters 40 and 42 towards the polarizing beam splitter 38. In this particular embodiment, the reflected portion of the first and second parts 24 and 26 of the homogeneously polarized input optical beam each experience a substantially π phase difference in the region of the step in the mirror for reflective phase shifters 40 and 42. One portion of the each of the first and second parts 24 and 26 is π radians out of phase with the other corresponding portion of the first and second parts 24 and 26 of the homogeneously polarized input optical beam 12.

Next, the reflected portions of the first and second parts 24 and 26 pass through the quarter wave plates 44 and 46, respectively, again. The quarter wave plates 44 and 46 convert the optical beams in the reflected first and second parts 24 and 26 to a linear polarization orthogonal to that of the incident polarization in the initially transmitted optical beam 24 and 26 from the polarization beam splitter 38. As a result, the quarter-wave plates 44 and 46 prevent the reflected first and second parts 24 and 26 from returning by the same path (e.g. toward the source 16) through the polarization beam splitter 38.

Next, the first and second parts 24 and 26 of the homogeneously polarized input optical beam 12 are combined in the polarization beam splitter 38 to produce an azimuthal inhomogeneously polarized optical beam 14. Again, the resulting polarization in this optical beam 14 remains stable for time periods greater than the time needed to obtain an image.

Referring to FIG. 3, a polarization converter 10(3) in accordance with another embodiment of the present invention is illustrated. The components of polarization converter 10(3) are identical to those in the polarization converter 10(2) described with reference to FIG. 2, except as set forth herein.

More specifically, the polarizing beam splitter 38 for the polarization converter 10(2) is replaced with a plate 48. In this particular embodiment, the plate 48 is positioned so that the homogeneously polarized input optical beam 12 intersects a surface 50 of plate 48 at a Brewster angle $\theta_b$ with respect to an axis C—C. The axis C—C is normal with respect to surface 50 of plate 48. A variety of different types of plates 48 can be used, such as glass plate. The plate 48 is used in place of the polarization beam splitter 38 to minimize the volume of material the optical beam or light 12 must traverse when undergoing polarization conversion. This is particularly true for short pulse and high-power laser sources.

In this particular embodiment, each of the quarter-wave plates have their fast axis positioned at forty-five degrees from the polarized axis of the first and second parts 24 and 26.

The operation of polarization converter 10(3) is also identical to those in the polarization converter 10(2) described with reference to FIG. 2, except as set forth herein. In this particular embodiment, the plate 48 receives and splits the homogeneously polarized input optical beam 12 into first and second parts 24 and 26 which are transmitted from the plate 48. More specifically, in this particular embodiment the p-polarized component of the optical beam 12 is transmitted completely through plate 48, while the s-polarized component is reflected back at the Brewster angle $\theta_b$. The plate 48 also combines the reflected first and second parts 24 and 26 of the homogeneously polarized input optical beam 12 to produce the inhomogeneously polarized optical beam 14. Again the rest of the operation of polarization converter 10(3) is the same as polarization converter 10(2).

Figure 4:
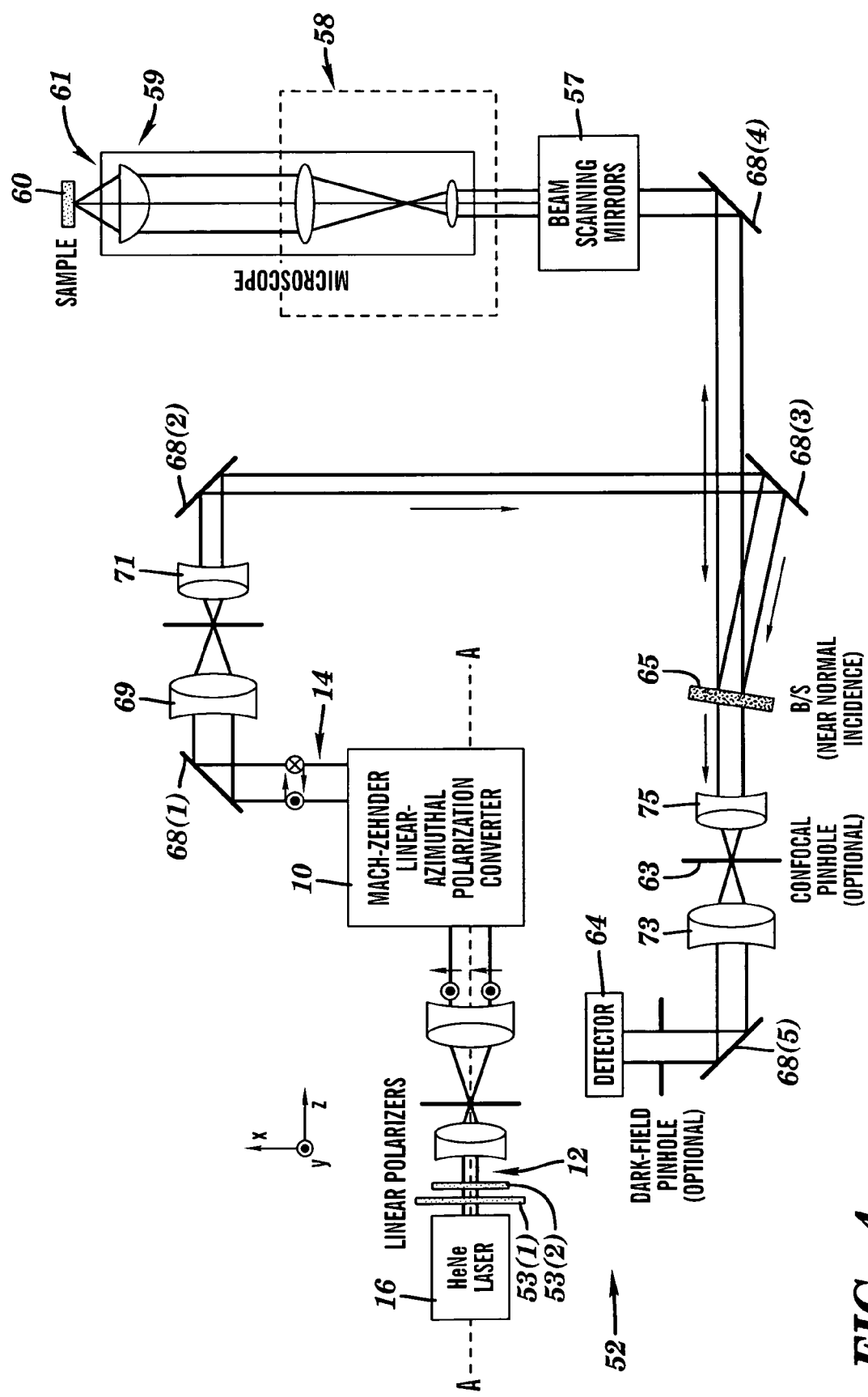
FIG. 4 is a block diagram of a microscope with a polarization converter in accordance with the present invention.

Referring to FIG. 4, a scanning confocal microscope 52 with a polarization converter 10 in accordance with another embodiment of the present invention is illustrated. Some or all of the components of the scanning microscope 52 discussed below may be contained within and/or connected together in a housing.

More specifically, in this particular embodiment the laser source or other suitable collimated beam source 16 provides the homogeneously polarized input optical beam or light 12 that extends along a first axis A—A along the direction of propagation of optical beam 12. In this particular example, the source 16 is a laser beam generation system which generates a linearly polarized HeNe laser beam, although other types of sources for the homogeneously polarized input optical beam 12 can be used.

Linear polarizer 53(1) and 53(2) or 53(1-2) are positioned to polarize the homogeneously polarized input optical beam 12 from the source to a first angle with respect to a second axis B—B that is perpendicular to the first axis A—A along which the homogeneously polarized input optical beam 12 propagates. In this particular embodiment, the first angle is substantially 45°, although other angles could be used.

The polarization converter 10 is positioned in the microscope 52 to receive the homogeneously polarized input optical beam 12 and to produce an inhomogeneously polarized optical beam 14. A variety of different types of polarization converters 10 can be used, such as the polarization converters 10(1)–10(3) shown in FIGS. 1–3 and described herein.

In this particular embodiment, the scanning microscope 52 also includes a microscope imaging system which includes an galvanometer-type beam scanning system 57, a telescope beam expander 58, a microscope objective lens 59, detector 64, lens 69, 71, 73, and 75, mirrors 68(1)–68(5), beam splitter 65, and object plane 63. The galvanometer-type beam scanning system 57 is positioned to receive the inhomogeneously polarized optical beam 14. The telescope beam expander 58 is positioned to receive the optical beam 14 from the galvanometer-type beam scanning system 57 and has an output to the input aperture of a microscope objective lens 59. The detector is positioned to collect scattered light, such as reflected, transmitted, or fluorescent light, from the sample 60. Lens 69, 71, 73, and 75 along with mirrors 68(1)–68(5), beam splitter 65, and object plane 63 direct the inhomogeneously polarized optical beam 14 to the galvanometer-type beam scanning system 57 and also to a detector 64. Although one particular example of the components and their configuration for a microscopic imaging system are shown, the microscopic imaging system could comprise other components in other configurations and a variety of different imaging systems could be used. Additionally, although one particular example of the components and their configuration for a microscope 52 is shown, the microscope 52 could comprise other components in other configurations.

The operation of the microscope 52 will now be discussed with reference to FIG. 4. When an image of a sample 60 is to be taken, the sample 60 is positioned adjacent objective lens 59. Meanwhile, in this particular example an input, linearly homogeneously polarized optical beam 12 is generated and transmitted in a first direction along a first axis A—A. The homogeneously polarized input optical beam 12 is polarized at substantially 45° with respect to a second axis B—B substantially perpendicular to the first axis A—A. A polarization converter 10 receives the homogenous polarized input optical beam 12 and produces an inhomogeneously polarized optical beam 14 as described in greater detail herein.

The inhomogeneously polarized optical beam 14 is reflected off of mirrors 68(1-4) and through lens 69 and 71 to galvanometer-type beam scanning system 57, through telescope beam expander 58, and on to microscope objective lens 59. The microscope objective lens 59 illuminates a small region of the sample 60. Scattered light 61, such as reflected, transmitted, or fluorescent, is collected. In this particular example, reflected scattered light is collected, but a similar arrangement allows transmitted scattered light to be collected.

An image of the scattered light is assembled, in a point-by-point fashion, by either scanning the beam across the sample 60 or scanning the sample 60 through the beam using suitable translation stages 62. The scattered light is collected, and focused on pinhole confocal to the object plane 63, through lenses 73 and 75 and then is detected by a detector 64. The signal or signals detected by the detector 64 are then processed by a suitable amplifier and computer to assemble the image and perform suitable signal processing to generate an image of the sample 60. The use and benefits of using an inhomogeneous polarized optical beam for imaging, such as in a microscope are discussed in greater detail below.

By way of example only, set forth below is a characterization of imaging modes to display the diffraction effects of the inhomogeneously polarized illumination. Both azimuthal and radial beam solutions are special cases of optical vortex beams. The axial null propagates as a vortex and persists both in the pupil and through the entire focal region. Unlike simple annular apodization, this illumination has an electric field which exhibits a π phase difference under inversion. When such a beam is used in a non-confocal scanning arrangement, the entire reflected beam is collected and coupled to the detection apparatus. In the confocal limit, only on-axis reflected light is collected. A flat, highly reflecting substrate will contribute no light to the axial point, and the confocal configuration is therefore a dark field imaging mode under azimuthal illumination. Accordingly, the following modes of imaging are compared:

Homogeneously Polarized Confocal (HPQ

Inhomogeneously Polarized Bright-field Non-confocal (IPN)

Inhomogeneously Polarized Dark-field Confocal (IPC)

Theoretical Foundations:

Both linearly polarized and circularly polarized beams correspond to free-space solutions of Maxwell's equations in which the state of polarization (SOP) is independent of spatial coordinate in the cross-section of the beam. These solutions are collectively referred to as "homogeneous" polarization. An inhomogeneously polarized beam will therefore have an SOP which varies over the pupil. In this particular investigation, cylindrical-vector (CV) optical beams are studied.

Figure 5A:
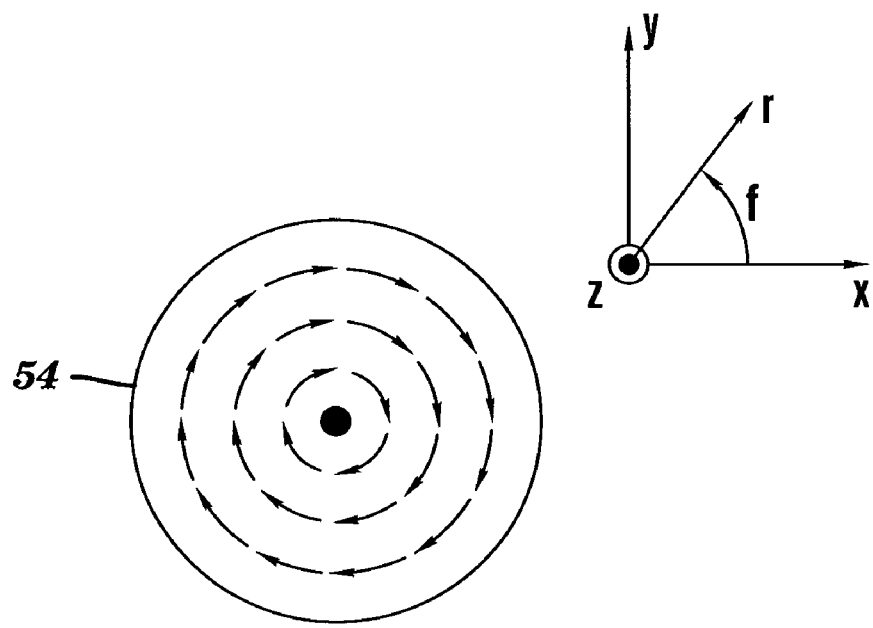
FIG. 5A is a cross-sectional diagram of an optical beam polarized in an azimuthal direction.
Figure 5B:
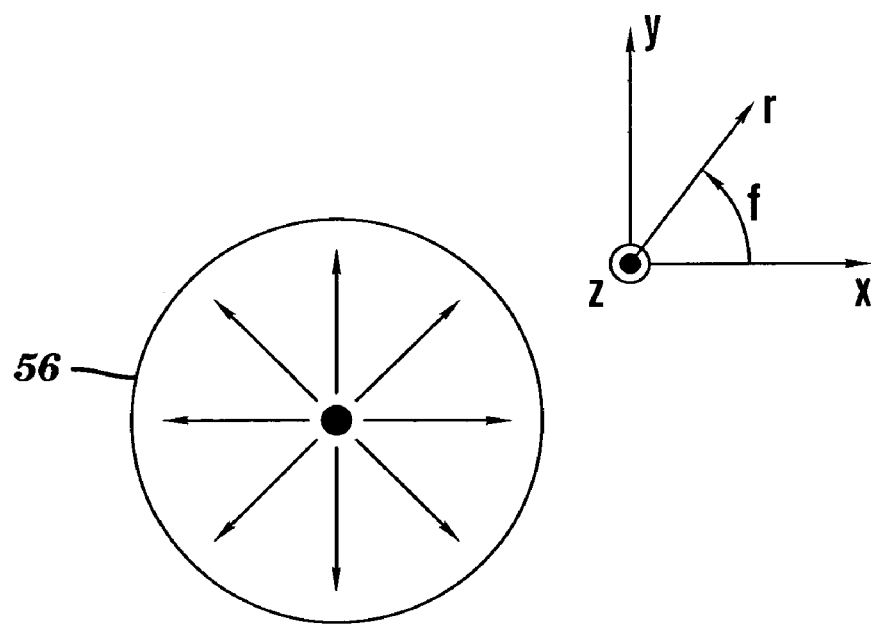
FIG. 5B is a cross-sectional diagram of an optical beam polarized in a radial direction.

A CV beam is one whose polarization has cylindrical symmetry about the optical axis. A special case of CV beams is the class of azimuthally polarized solutions to the vector wave equation. Azimuthal beams are exact solutions to the free-space vector wave equation:

$$\nabla \times \nabla \times \overline{E} - k^2 \overline{E} = 0 \qquad (1)$$

in which the electric field is polarized in the azimuthal direction throughout the pupil in the pattern illustrated in FIG. 5A. Electric fields of cylindrical vector beams where r is the radial direction, φ is the azimuthal direction, and z is the longitudinal direction and axis of propagation are polarized in the azimuthal direction as shown in FIG. 5A and in the radial direction as shown in FIG. 5B.

Due to the cylindrical symmetry of CV beams, they are best described in cylindrical coordinates where r is the radial direction, φ is the azimuthal direction, and z is the longitudinal direction and axis of propagation. The azimuthally-polarized solution of Jordan and Hall assumes the form:

$$\overline{E}(r, z) = \hat{\phi} \Psi(r, z) = \hat{\phi} f(r, z) e^{ikz}. \qquad (2)$$

By inserting this ansatz into the vector wave equation (1), the following scalar equation for the azimuthal component of the field is found:

$$\frac{1}{r}\frac{\partial}{\partial r}\left(r\frac{\partial f}{\partial r}\right) + \frac{\partial^2 f}{\partial z^2} + 2ik\frac{\partial f}{\partial z} - \frac{f}{r^2} = 0. \qquad (3)$$

The paraxial approximation of the azimuthal paraxial scalar wave equation (APSWE) eliminates the second derivative:

$$\frac{1}{r}\frac{\partial}{\partial r}\left(r\frac{\partial f}{\partial r}\right) + 2ik\frac{\partial f}{\partial z} - \frac{f}{r^2} = 0. \qquad (4)$$

From this equation, the final form of the azimuthally polarized beam can be derived:

$$\overline{E}(r, z) = \qquad (5)$$

$$\hat{\phi}\frac{Aw_0}{w(z)}\exp\left[i\left(k - \frac{\beta^2}{2k}\right)z - i\Phi(z)\right]J_1\left[\frac{\beta r}{1 + \frac{iz}{L}}\right] \cdot \exp\left[\left(\frac{-1}{w^2(z)} + \frac{ik}{2R(z)}\right)\left(r^2 + \frac{\beta^2 z^2}{k^2}\right)\right]$$

where A is an arbitrary amplitude, λ is the vacuum wavelength, $\mu_o$ is the permeability of free space, c is the velocity of light, and the beam parameters are defined as follows:

$$L = \frac{kw_0^2}{2} \qquad (6)$$

$$w(z) = w_0 \sqrt{\left(1 + \frac{2z}{kw_0^2}\right)^2} \qquad (7)$$

-continued $$R(z) = z\left[1 + \left(\frac{kw_0^2}{2z}\right)\right]^2 \qquad (8)$$

$$\Phi(z) = \arctan\left(\frac{z}{L}\right) \qquad (9)$$

$$\beta = k \sin \theta \qquad (10)$$

$$k = \frac{2\pi}{\lambda} \qquad (11)$$

$$w_0 = \frac{\lambda}{\pi\theta} \qquad (12)$$

$\beta$ gauges the numerical aperture of the beam; all other parameters are familiar from scalar Gaussian beam propagation. The magnitude of the electric field near the focal region is illustrated in FIG. 2. A universal characteristic of this class of beams is an on-axis energy null which results in an annular energy distribution both in the focal region and at the pupil.

Figure 6C:
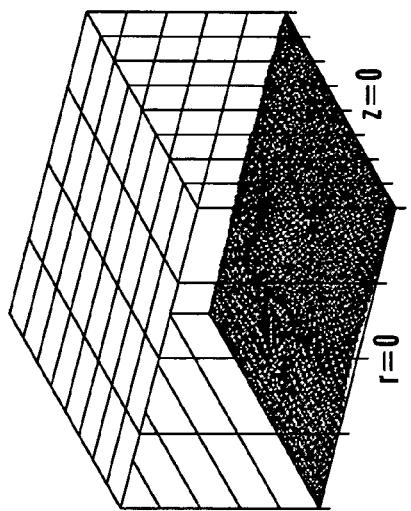
FIG. 6C is a three dimensional graph of a normalized magnitude of the z-component of the electrical field for radial polarization of an optical beam near the focal region.
Figure 6B:
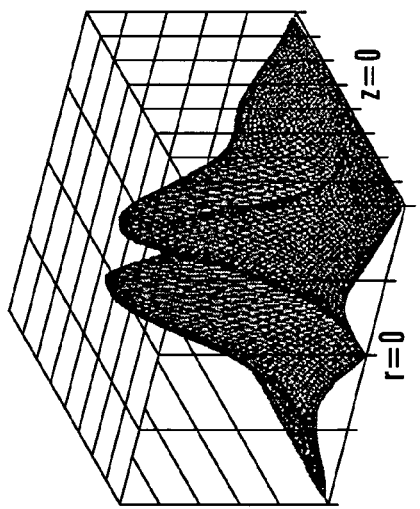
FIG. 6B is a three dimensional graph of a normalized magnitude of the r-component.
Figure 6A:
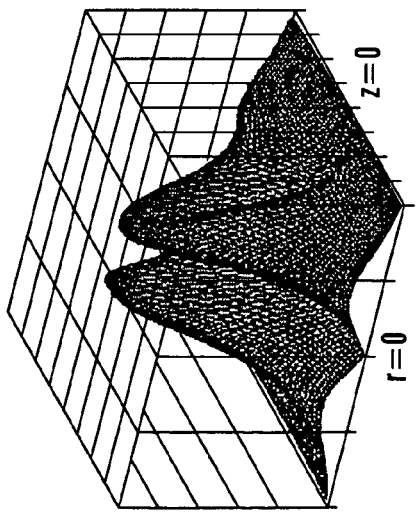
FIG. 6A is a three dimensional graph of a normalized magnitude of the electric field for azimuthal polarization of an optical beam near the focal region.

Referring to FIG. 6A, a normalized magnitude of the electric field for azimuthal polarization near the focal region (z=0) is shown. The center of the beam is located at r=0.

A similar derivation of the vector wave equation for the magnetic field H:

$$\Box \times \Box \times \overline{H} - k^2 \overline{H} = 0 \qquad (13)$$

can also be carried out. Therefore, a magnetic-field analog of the azimuthally polarized solution in equation 2 exists:

$$\overline{H}(r,z) = \hat{\phi} g(r,z) e^{ikz}. \qquad (14)$$

From this the final form of the analogous magnetic field can be deduced:

$$\overline{H}(r, z) = \qquad (15)$$

$$\hat{\phi}\frac{Aw_0}{w(z)}\exp\left[i\left(k - \frac{\beta^2}{2k}\right)z - i\Phi(z)\right]J_1\left[\frac{\beta r}{1 + \frac{iz}{L}}\right]\cdot \exp\left[\left(\frac{-1}{w^2(z)} + \frac{ik}{2R(z)}\right)\left(r^2 + \frac{\beta^2 z^2}{k^2}\right)\right]$$

The Maxwell equation describing the curl of the magnetic field under harmonic time dependence yields the vector E-field:

$$\overline{E} = \left(\frac{1}{-i\omega\epsilon}\right)\overline{\nabla} \times \overline{H} \qquad (16)$$

where B=µH, $\mu_o$, $\epsilon$ is the permitivity, and $e^{-i\omega t}$ time dependence is assumed. Inserting equation (15) into equation (16), yields a solution for the electric field which is primarily polarized in the radial direction, but also has a polarization in the z-direction which is non-negligible near a focal region. Therefore, such beams are referred to as "radially polarized" beams as shown in FIG. 5B. By using similar equations, the magnetic field for azimuthal polarization can also be determined. It also has a strong radial component and a non-negligible z-component near focus.

A graph of the normalized magnitude of the r-component of the electric field for radial polarization near the focal region (z=0) is shown in FIG. 6B. A graph of the normalized magnitude of the z-component of the electric field for radial polarization near the focal region (z=0) is shown in FIG. 6C. The center of the beam is located at r=0 in these graphs. FIG. 6B shows the shape of the r-component of the electric field as it passes through focus. Comparing FIG. 6B with the electric field for azimuthal polarization in FIG. 6A, it can be seen that the transverse components of the electric fields have approximately the same shape in each case. However, for the radially polarized beam, the longitudinal (z) component is non-zero and well-confined to the focal region in FIG. 6C.

Experimental Results

The experimental samples discussed herein by way of example only fall into two categories: (1) point scatterers comparable to the wavelength and somewhat smaller than the diffraction-limited spot size, and (2) semiconductor samples consisting of adjacent metal (high reflectivity) and dielectric (low reflectivity) regions. The former are measures of the system point spread function (PSF). The latter is useful for examining image contrast that is typically detected by the native reflectivity difference between the metal and dielectric in bright field images. For many inspection purposes, dark field imaging techniques which identify surface topology are preferable.

Figure 7A:
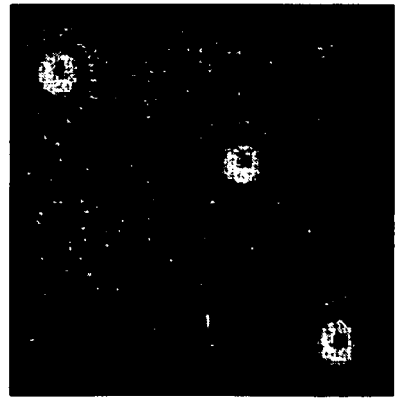
FIG. 7A is an inhomogeneously polarized dark-field confocal image of 0.8 micrometer polystyrene beads on a smooth glass substrate taken with azimuthally polarized illumination.
Figure 7B:
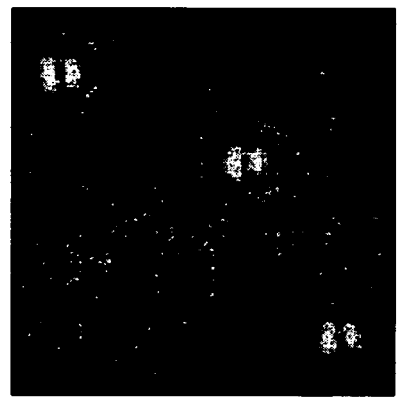
FIG. 7B is an inhomogeneously polarized dark-field confocal image of 0.8 micrometer polystyrene beads on a smooth glass substrate taken with azimuthally polarized illumination from the vertically polarized arm of the converter.
Figure 7C:
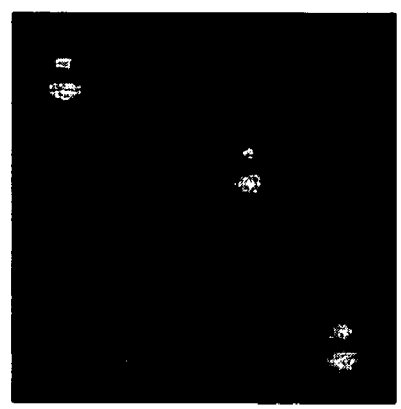
FIG. 7C is an inhomogeneously polarized dark-field confocal image of 0.8 micrometer polystyrene beads on a smooth glass substrate taken with azimuthally polarized illumination from the horizontally polarized arm of the converter.

Referring to FIGS. 7A–7C, a series of IPC images of 0.8 µm diameter polystyrene beads on a smooth glass substrate taken with azimuthally polarized illumination are shown. The image in FIG. 7A shows a nearly rotationally symmetric PSF with a center null. Individual images in FIGS. 7B and 7C, of the orthogonal linear components are used to assess the balance of the interferometer and the uniformity of the illumination across the image field. In this particular example, the images of 0.8 µm diameter polystyrene beads were taken in IPC mode using a 40×(NA=0.65) objective. The field size is about 13.41 µm in this particular example. The incident illumination was azimuthally polarized in FIG. 7A, was taken from the first part of the optical beam, also referred to as the vertically polarized arm in this example, of the polarization converter 10 in FIG. 7B, and was taken from the second part of the optical beam, also referred to as the horizontally polarized arm in this example, of the polarization converter 10.

Figure 8A:
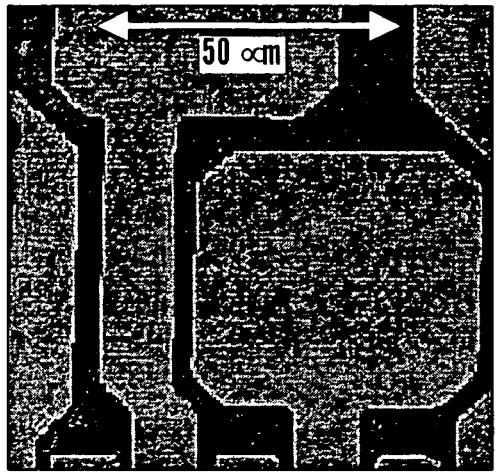
FIG. 8A is an electron micrograph image of a semiconductor circuit.
Figure 8B:
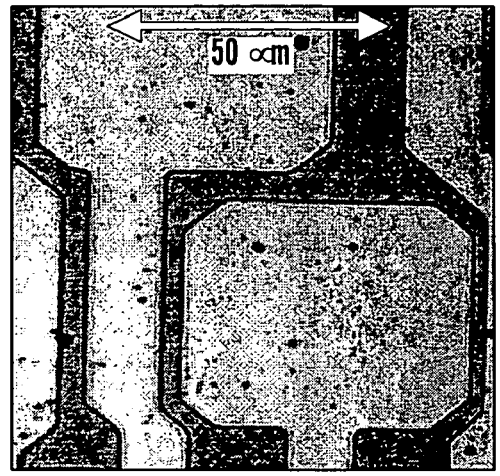
FIG. 8B is a homogeneous polarized confocal image of the semiconductor circuit.
Figure 8C:
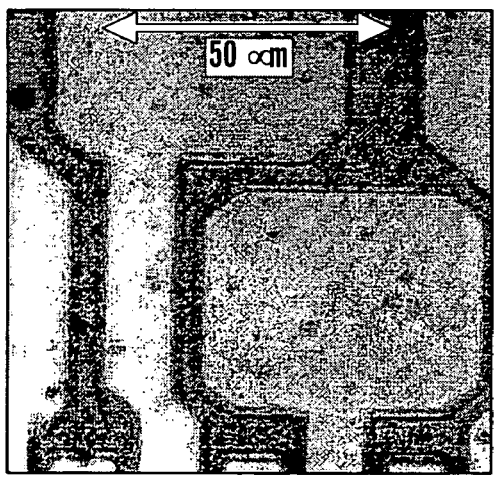
FIG. 8C is an azimuthal inhomogeneously polarized bright-field non-confocal image of the semiconductor circuit.
Figure 8D:
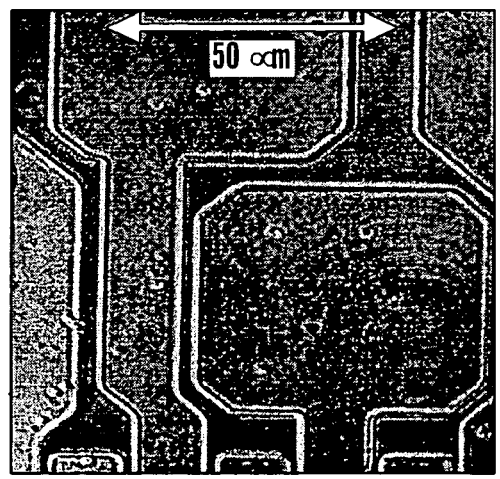
FIG. 8D is an inhomogeneously polarized dark-field confocal image of a semiconductor circuit.

Referring to FIGS. 8A–8D, a series of images of a semiconductor taken with four different combinations of illuminations and imaging modes are shown. The image in FIG. 8A shows an electron micrograph of the sample. The HPC image in FIG. 8B and the azimuthal IPN image in FIG. 8C show a higher intensity in the metal regions than in the substrate regions. The azimuthal IPC image in FIG. 8D shows higher intensity at the metal-dielectric boundary and at imperfections (i.e., dust or bubbles) where there are changes in height in the semiconductor surface. In this particular example, the subject of the images is an 85 μm section of a semiconductor which is composed of metal and dielectric. The image in FIG. 8A was taken by an electron microscope and the images in FIGS. 8B–8D were taken using a 25×(NA=0.5) objective in HPC mode in FIG. 8B, in azimuthal IPN mode in FIG. 8C, and in azimuthal IPC mode in FIG. 8D.

Analysis of Examples

The image content and quality for each imaging mode is discussed below. In FIGS. 8A–8D, both of the bright-field modes (HPC and IPN) show sample features which are dominated by the reflection contrast of the material, with some features (the dark region of the metal-dielectric boundary for example) possibly related to surface slope. The dark field mode (IPQ rejects components which are reflected from a smooth surface. This is evident from the semiconductor image, in which bright lines appear at surface gradients. An important difference between this imaging mode and, for example, lateral DIC microscopy, is the isotropic nature of the gradient image. Because of the symmetry of the PSF, the azimuthal IPC mode provides a gradient signal independent of the surface gradient orientation.

Referring to FIGS. 9A–9C, this occurs because a CV beam focuses to an annulus (or ring) with a null in the center, instead of focusing to a single central spot as with a Gaussian beam. Unlike the Gaussian beam, two "points" on opposite sides of the annulus have polarizations which are π out of phase. If the two points reflect from different sample heights, they will have a path difference equal to twice the step height. When the light reaches the dark field pinhole, the net axial intensity from these two points will be greater than zero, and on-axis light will be detected as shown in FIG. 8B. An intensity maximum occurs when the two points are in phase; this is caused by a step height that corresponds with a π/2 phase shift (or a height difference of λ/4). However, if these two points reflect from a flat region of the sample, they will remain π out of phase as shown in FIG. 8C. When this light reaches the dark field pinhole, the net axial intensity from these two points will be zero and no associated light will be detected. The intensity increase is independent of the direction of the gradient.

Comparing FIG. 8B to FIG. 8C, the resolution in the IPN image appears to be visibly lower than the HPC image. Two effects contribute to the lower resolution: (1) the pupil is underfilled in the IPN mode, which provides a larger illuminating PSF, and (2) scanning microscopy without a confocal pinhole has inherently lower resolution than confocal microscopy (by square root of two). To ensure a stable scanning configuration for the azimuthally polarized beam, the beam must underfill the pupil. On the other hand, the homogeneously polarized beam has a Gaussian beam shape which slightly overfills the pupil. This allows full use of the objective's numerical aperture (NA) and, with confocal microscopy, diffraction limited performance. The unevenly illuminated pupil causes the NA to decrease, and therefore the modulation transfer function (MTF) of the illumination system has a lower high-frequency content than when the pupil is evenly illuminated.

Figure 10:
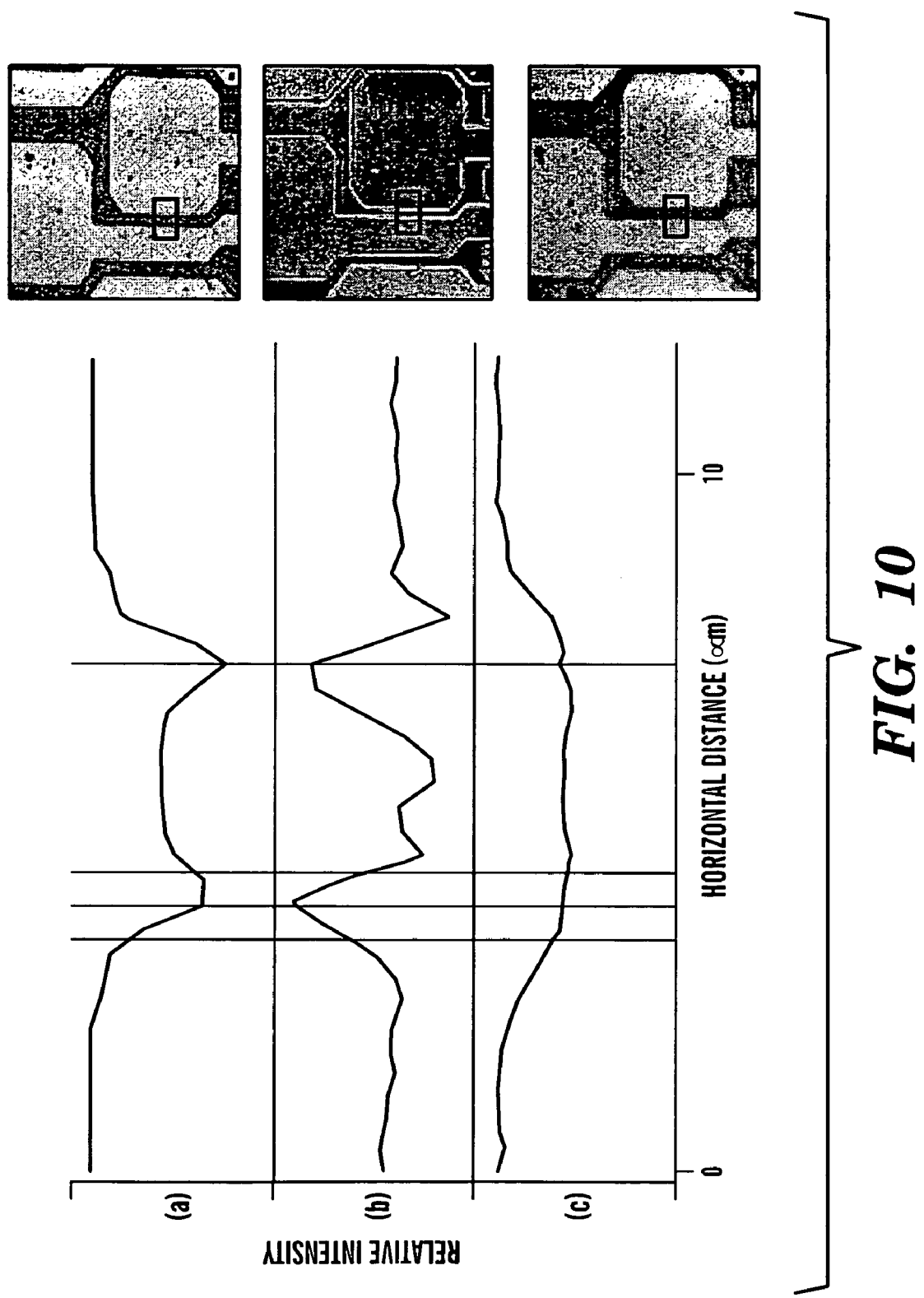
FIG. 10 is a graph illustrating relative intensity plots of a horizontal line segment from images taken in a homogeneous polarized confocal mode, in azimuthal inhomogeneously polarized dark-field confocal mode, and azimuthal inhomogeneously polarized bright-field non-confocal mode.

Referring to FIG. 10, the relative intensity of a horizontal line segment from images is shown taken in HPC mode section (a) of FIG. 10, in azimuthal IPC mode in section (b) of FIG. 10, and in azimuthal IPN mode in section (c) of FIG. 10. In these images, a decrease in intensity on the plots corresponds to a darkening of the image. The line segment traverses two edges of the semiconductor. The resolution in the azimuthal IPN mode, is visibly lower than the other two modes. For the IPC and HPC modes, the resolution is approximately the same even though the pupil is underfilled with the azimuthally polarized beam. The width of the diffraction limited resolution (about 1.1 μm) is indicated by the vertical gray line pair. By using the azimuthally polarized illumination in the IPC mode, a nearly diffraction limited performance is achieved.

The ability to detect small changes in surface height independent of gradient direction using the IPC mode may prove useful in such areas as surface profiling and particle detection. In the semiconductor industry, this method has the potential for being used for semiconductor quality control because of its ability to highlight line edges and imperfections. This method could also be used to inspect the masks that are used to make semiconductors for errors that would affect the quality of the semiconductor.

Accordingly, the above discussion and examples explored the use of inhomogeneously polarized illumination in scanning optical microscopy. This discussion illustrated that the use of an azimuthally polarized beam in a confocal detection mode produces a dark field image with a gradient-sensitive intensity which is independent of the gradient direction. The resolution measurements show an annular point spread function and a resolution similar to that of confocal microscopy with a fully-illuminated pupil.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Accordingly, the invention is limited only by the following claims and equivalents thereto.

What is claimed is:

1. A microscope comprising:
    a source for a homogeneously polarized input optical beam;
    a polarization converter which produces an inhomogeneously polarized optical beam from the homogeneously polarized input optical beam;
    a microscopic imaging system which captures an image of a sample using the inhomogeneously polarized optical beam; wherein the polarization converter comprises:
    a first polarization beam splitter that splits the homogeneously polarized input optical beam into a first part and a second part;
    a first phase shifter which shifts at least one portion of the first part of the input optical beam by a first phase;
    a second phase shifter which shifts at least one portion of the second part of the input optical beam by substantially the first phase; and
    a second polarization beam splitter which combines the phase shifted portion and substantially all other portions of the first part of the input optical beam with the phase shifted portion and substantially all other portions of the second part of the input optical beam to produce the inhomogeneously polarized optical beam.

2. The microscope as set forth in claim 1 wherein the polarization converter further comprises a variable delay that delays the second part of the input optical beam a first period of time.

3. The microscope as set forth in claim 1 wherein the polarization converter further comprises a first spatial filter connected to an input of the first polarization beam splitter.

4. The microscope as set forth in claim 1 wherein the polarization converter further comprises a second spatial filter connected to an output of the second polarization beam splitter.

5. The microscope as set forth in claim 1 wherein the inhomogeneously polarized optical beam produced by the polarization converter is substantially smooth and continuous.

6. The microscope as set forth in claim 5 wherein the inhomogeneously polarized optical beam produced by the polarization converter is a substantially radially, inhomogeneously polarized optical beam.

7. A method for microscopic scanning, the method comprising:
providing a homogeneously polarized input optical beam;
producing an inhomogeneously polarized optical beam from the input optical beam;
capturing a microscopic image using the inhomogeneously polarized optical beam; wherein the producing the homogeneously polarized optical beam comprises:
splitting the input optical beam into a first part and a second part;
shifting at least one portion of the first part of the input optical beam by a first phase;
shifting at least one portion of the second part of the input optical beam by substantially the first phase; and
combining the phase shifted portion and substantially all other portions of the first part of the input optical beam with the phase shifted portion and substantially all other portions of the second part of the input optical beam to produce the inhomogeneously polarized optical beam.

8. The method as set forth in claim 7 wherein the producing the inhomogeneously polarized optical beam further comprises delaying the second part of the input optical beam a first period of time.

9. The method as set forth in claim 7 wherein the producing the inhomogeneously polarized optical beam further comprises spatial filtering the input optical beam.

10. The method as set forth in claim 7 wherein the producing the inhomogeneously polarized optical beam further comprises spatially filtering the inhomogeneously polarized optical beam.

11. The method as set forth in claim 7 wherein the producing the inhomogeneously polarized optical beam further comprises producing an inhomogeneously polarized optical beam which is substantially smooth and continuous.

12. The method as set forth in claim 11 wherein the inhomogeneously polarized optical beam is a substantially radially, inhomogeneously polarized optical beam.

* * * * *